US010221337B2

(12) United States Patent
Karp et al.

(10) Patent No.: US 10,221,337 B2
(45) Date of Patent: Mar. 5, 2019

(54) TWO-PART ADHESIVE COMPOSITION AND METHOD OF MAKING AN ADHESIVE COMPOSITION

(71) Applicant: 3M INNOVATIVE PROPERTIES COMPANY, St. Paul, MN (US)

(72) Inventors: Gregory P. Karp, Mahtomedi, MN (US); Robert S. Clough, St. Paul, MN (US); Michael A. Kropp, Cottage Grove, MN (US); Kathleen S. Shafer, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 15/526,520

(22) PCT Filed: Nov. 6, 2015

(86) PCT No.: PCT/US2015/059422
§ 371 (c)(1),
(2) Date: May 12, 2017

(87) PCT Pub. No.: WO2016/077166
PCT Pub. Date: May 19, 2016

(65) Prior Publication Data
US 2017/0313906 A1    Nov. 2, 2017

Related U.S. Application Data

(60) Provisional application No. 62/079,800, filed on Nov. 14, 2014.

(51) Int. Cl.
*C09J 4/00*     (2006.01)
*C08K 5/17*     (2006.01)
*C08G 77/20*    (2006.01)
*C08K 5/55*     (2006.01)
*C08F 216/12*   (2006.01)

(52) U.S. Cl.
CPC ............. *C09J 4/00* (2013.01); *C08F 216/125* (2013.01); *C08G 77/20* (2013.01); *C08K 5/17* (2013.01); *C08K 5/55* (2013.01)

(58) Field of Classification Search
CPC ....... C08F 216/125; C08G 77/20; C08K 5/17; C08K 5/55; C09J 133/10; C09J 133/26; C09J 4/00
USPC ......................................... 526/279, 332, 334
See application file for complete search history.

(56) References Cited

U.S. PATENT DOCUMENTS

| 3,275,611 A | 9/1966 | Mottus |
| 4,538,920 A | 9/1985 | Drake |
| 5,082,147 A | 1/1992 | Jacobs |
| 5,539,070 A | 7/1996 | Zharov |
| 5,616,796 A | 4/1997 | Pocius |
| 5,621,143 A | 4/1997 | Pocius |
| 5,684,102 A | 11/1997 | Pocius |
| 5,690,780 A | 11/1997 | Zharov |
| 5,691,065 A | 11/1997 | Zharov |
| 5,795,657 A | 8/1998 | Pocius |
| 5,859,160 A | 1/1999 | Righettini |
| 5,935,711 A | 8/1999 | Pocius |
| 6,252,023 B1 | 6/2001 | Moren |
| 6,410,667 B1 | 6/2002 | Moren |
| 6,479,602 B1 | 11/2002 | Moren |
| 6,486,090 B1 | 11/2002 | Moren |
| 6,777,512 B1 | 8/2004 | Sonnenschein |
| 6,777,612 B2 | 8/2004 | Sugiura |
| 6,849,569 B2 | 2/2005 | Moren |
| 7,105,584 B2 | 9/2006 | Chambers |
| 7,732,543 B2 | 6/2010 | Loch |
| 2003/0195318 A1 | 10/2003 | Moren |
| 2007/0135601 A1* | 6/2007 | Diakoumakos ....... C07F 7/1836 526/195 |
| 2007/0246245 A1* | 10/2007 | Ahn ........................ C08K 5/55 174/126.2 |
| 2011/0135923 A1 | 6/2011 | Ahn et al. |

FOREIGN PATENT DOCUMENTS

| CN | 101824292 | 9/2010 |
| JP | 2002-513441 A | 5/2002 |
| JP | 2005-514478 A | 5/2005 |
| JP | 2006-522206 A | 9/2006 |
| JP | 2009-541531 A | 11/2009 |
| JP | 6-128503 A | 5/2015 |
| JP | 2016-513744 A | 5/2016 |
| JP | 6-128502 A | 5/2017 |
| KR | 2005-0107466 | 11/2005 |

OTHER PUBLICATIONS

3M Scotch-Weld Structural Plastic Adhesive DP-8005, Black (Part A), CP096A v1.4, 2011, 3M Material Safety Data Sheet, pp. 1-26.
3M(TM) Scotch-Weld(TM) Structural Plastic Adhesive DP8005, 3M Material Safety Data Sheet, 2010 and 2012, pp. 1-17.
Brewis, "Adhesion Problems at Polymer Surfaces" Progress in Rubber and Plastic Technology, 1985, vol. 1, No. 4, pp. 1-21.
Minford, "Treatise on Adhesion and Adhesives", Marcel Dekker, 1991, vol. 7, pp. 333-435.
International Search report for International Application No. PCT/US2015/059422 dated Jan. 13, 2016, 4 pages.

*Primary Examiner* — William K Cheung
(74) *Attorney, Agent, or Firm* — Bradford B. Wright

(57) ABSTRACT

A two-part adhesive composition includes: a Part A including a complex of an organoborane and an amine complexing agent, and reactive diluent selected from the group consisting of at least one vinyl ether, at least one vinylpolysiloxane, or combinations thereof; and a Part B. Part B includes a decomplexing agent that decomplexes the organoborane and the amine complexing agent, and at least one silicon-free free-radically polymerizable ethylenically-unsaturated compound selected from the group consisting of (meth)acrylates, (meth)acrylamides, and combinations thereof. The two-part adhesive composition is essentially free of organic polythiol compounds. A method of making an adhesive composition by mixing Part A with Part B is also disclosed.

12 Claims, No Drawings

(56) References Cited

FOREIGN PATENT DOCUMENTS

| | | |
|---|---|---|
| KR | 10-2011-0042330 A | 4/2011 |
| WO | WO 99/01484 A1 | 1/1999 |
| WO | WO 2001-068783 | 9/2001 |
| WO | WO 03/057743 A2 | 7/2003 |
| WO | WO 2004/078871 | 9/2004 |
| WO | WO 2007/149422 A2 | 12/2007 |
| WO | WO 2001-032716 | 5/2011 |
| WO | WO 2001-032717 | 5/2011 |
| WO | WO 2014-140138 | 9/2014 |
| WO | WO 2014/140138 A1 | 9/2014 |
| WO | WO 2015-006094 | 1/2015 |
| WO | WO 2015-148319 | 10/2015 |

\* cited by examiner

TWO-PART ADHESIVE COMPOSITION AND METHOD OF MAKING AN ADHESIVE COMPOSITION

This application is a US National Stage of PCT International Patent application No. PCT/US2015/059422, filed Nov. 6, 2015, and claims priority to U.S. Provisional patent application Ser. No. 62/079,800, filed Nov. 14, 2014 and which application is incorporated herein by reference.

BACKGROUND

There is a continuing need for materials and chemistries that can form polymers, including crosslinked polymers, rapidly under ambient or mild conditions, particularly in the presence of oxygen.

Various methods for adhesively bonding low surface energy substrates such as polyethylene, polypropylene, and tetrafluoroethylene, as well as higher energy substrates have been developed. One approach involves the use of acrylic bonding compositions that include acrylic monomer, an organoborane-amine complex, and a decomplexing agent, i.e., a compound that decomplexes the amine from the organoborane, which then initiates polymerization of the acrylic monomer.

Due to their unstable nature, such acrylic bonding compositions are typically supplied as two-part systems that are to be mixed immediately prior to use. The two-parts consist of a part A composition (often called Part A composition) that contains an organoborane-amine complex in a reactive diluent, and a second part (often called Part B) that contains a polymerizable monomers and polymer. Various reactive diluents have been described that can be added to bonding compositions, including 1,4-dioxo-2-butene-functional compounds as reported in U.S. Pat. No. 6,252,023 (Moren) and aziridine-functional compounds as reported in U.S. Pat. No. 5,935,711 (Pocius et al.). Vinyl aromatic compounds of the type reported in PCT Publication WO 01/68783 (Moren) have also been disclosed. These reactive diluents all have shortcomings, including instability in the presence of the organoborane-amine complex and/or toxicity.

SUMMARY

There is a continuing need for alternative reactive diluents that do not prematurely cause curing of the Part A composition, or adversely affect curing of the adhesive when Part A composition and Part B are mixed.

The present disclosure provides compositions, particularly flowable polymerizable compositions, that can cure (i.e., polymerize and/or crosslink) under ambient or mild conditions, particularly in the presence of oxygen (e.g., $O_2$ or a peroxygen compound) to form solids, including viscoelastic solids. The compositions can be used to form adhesives, sealants, encapsulants, and potting resins, for example. Such compositions include an organoborane-amine complex (e.g., a trialkylborane-amine complex), which can be used in the presence of oxygen or a peroxygen compound to initiate the curing (i.e., polymerization and/or crosslinking).

Unexpectedly, the present inventors have found that for certain organoborane-amine complexes, diluents containing vinyl ethers, and/or vinyl-terminated polysiloxanes demonstrate stability with respect to the organoborane complex, and can function as an extender for the complex. Later, in the presence of a decomplexing agent or a two-part bonding composition comprising at least one free-radically polymerizable ethylenically-unsaturated compound and a decomplexing agent these compositions did react or cure.

In a first aspect, the present disclosure provides a two-part adhesive composition comprising:
(I) a Part A composition comprising:
(a) a complex of an organoborane and an amine complexing agent, wherein the amine complexing agent is represented by the formula

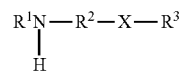

wherein:
$R^1$ represents H or an alkyl group having from 1 to 4 carbon atoms;
$R^2$ represents an alkylene group having from 2 to 12 carbon atoms;
$R^3$ represents H or an alkyl group having from 1 to 4 carbon atoms, or an aminoalkyl group having from 2 to 6 carbon atoms; and
X represents O or

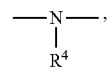

wherein $R^4$ represents H or an alkyl group having from 1 to 4 carbon atoms; and
(b) reactive diluent selected from the group consisting of components:
(i) at least one vinyl ether represented by the formula

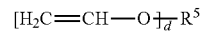

wherein:
$R^5$ represents a d-valent organic group having from 1 to 18 carbon atoms, wherein the organic group is composed of carbon, hydrogen, and optionally oxygen; and
d represents 1, 2, 3, or 4; or
(ii) at least one vinylpolysiloxane represented by the formula

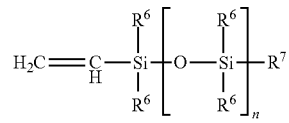

wherein:
each $R^6$ independently represents an alkyl group having from 1 to 6 carbon atoms, or a phenyl group;
$R^7$ represents an alkyl group having from 1 to 18 carbon atoms or a vinyl group; and
n is a positive integer in the range of from 1 to 10,
wherein if $R^3$ represents an alkyl group having from 1 to 4 carbon atoms and X represents O, then the reactive diluent is essentially free of component (i); and
(iii) combinations of components (i) and (ii); and (II) a Part B composition comprising:
a decomplexing agent that decomplexes the organoborane and the amine complexing agent; and
at least one silicon-free free-radically polymerizable ethylenically-unsaturated compound selected from the group consisting of (meth)acrylates, (meth)acrylamides, and combinations thereof,
wherein the two-part adhesive composition is essentially free of organic polythiol compounds.

In a second aspect, the present disclosure provides a method of making an adhesive composition, the method comprising combining a Part A composition and a Part B composition to provide the adhesive composition, wherein the part A composition comprises:
(a) a complex of an organoborane and an amine complexing agent, wherein the amine complexing agent is represented by the formula

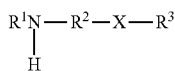

wherein:
$R^1$ represents H or an alkyl group having from 1 to 4 carbon atoms;
$R^2$ represents an alkylene group having from 2 to 12 carbon atoms;
$R^3$ represents H, an alkyl group having from 1 to 4 carbon atoms, or an aminoalkyl group having from 2 to 6 carbon atoms; and
X represents O or

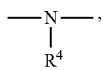

wherein $R^4$ represents H or an alkyl group having from 1 to 4 carbon atoms; and
(b) reactive diluent selected from the group consisting of components:
(i) at least one vinyl ether represented by the formula

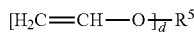

wherein:
$R^5$ represents a d-valent organic group having from 1 to 18 carbon atoms, wherein the organic group is composed of carbon, hydrogen, and optionally oxygen; and
d represents 1, 2, 3, or 4; or
(ii) at least one vinylpolysiloxane represented by the formula

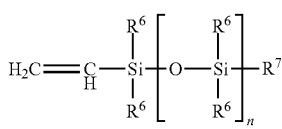

wherein:
each $R^6$ independently represents an alkyl group having from 1 to 6 carbon atoms, or a phenyl group;
$R^7$ represents an alkyl group having from 1 to 18 carbon atoms or a vinyl group; and
n is a positive integer in the range of from 1 to 10; and
(iii) combinations of components (i) and (ii),
wherein if $R^3$ represents an alkyl group having from 1 to 4 carbon atoms and X represents O, then the reactive diluent is essentially free of the component (i),
wherein the part B composition comprises:
a decomplexing agent that decomplexes the organoborane and the amine complexing agent; and
at least one ethylenically-unsaturated compound selected from the group consisting of (meth)acrylates, (meth)acrylamides, and combinations thereof, and
wherein the adhesive composition is essentially free of organic polythiol compounds.

As used herein:
The term "aliphatic group" means a saturated or unsaturated linear or branched hydrocarbon group. This term is used to encompass monovalent groups such as alkyl, alkenyl, and alkynyl groups, for example, as well as corresponding groups with higher valencies.

The term "essentially free of" means containing less than 1 percent by weight of, preferably containing less than 0.9 percent by weight of, more preferably containing less than 0.5 percent by weight of, more preferably containing less than 0.3 percent by weight of, more preferably containing less than 0.1 percent by weight of, more preferably containing less than 0.01 percent by weight of, and more preferably completely free of.

A group that may be the same or different is referred to as being "independently" something. When a group is present more than once in a formula described herein, each group is "independently" selected, whether specifically stated or not. For example, when more than one R group is present in a formula, each R group is independently selected. Furthermore, subgroups contained within these groups are also independently selected.

The term "organic group" means a hydrocarbon group (with optional elements other than carbon and hydrogen, including oxygen, nitrogen, sulfur, phosphorus, halogen, and/or silicon). In some embodiments, the organic group does not include silicon. The organic group can be monovalent, divalent, trivalent, or any other desired valency. Exemplary organic groups include aliphatic groups, aromatic groups, and heterocyclic groups, and combinations thereof.

As used herein, the term "organic polythiol compound" refers to an organic compound containing more than one —SH group. In some embodiments, compositions according to the present disclosure may be essentially free of "organic polythiol compounds" and/or —SH group.

As used herein, the term "room temperature" refers to a temperature of 19° C. to 25° C., or more often to a temperature of 21° C.

Features and advantages of the present disclosure will be further understood upon consideration of the detailed description as well as the appended claims.

DETAILED DESCRIPTION

Compositions of the present disclosure include an organoborane-base complex, especially those containing a trialkylborane, that can be used in the presence of oxygen (e.g., $O_2$ or a peroxygen compound) to initiate the curing (polymerizing and/or crosslinking) of a flowable polymerizable composition to form solids, including viscoelastic solids.

In particular, the present disclosure provides a composition (Part A) that includes: an organoborane-base complex, wherein the base is a complexing agent having one or more amine groups; and a reactive diluent. If combined with a decomplexing agent for the organoborane-base complex, the composition cures by free-radical polymerization. The role of the decomplexing agent is to liberate the organoborane from the organoborane-base complex. The composition is suitable for use in certain two-part adhesive compositions wherein a part B composition includes a decomplexing agent and free-radically polymerizable ethylenically-unsaturated compound(s).

The organoborane-base complex, especially a trialkylborane-base complex, is used to initiate free-radical polymerization and/or crosslinking reactions.

An organoborane, especially a trialkylborane, in the presence of oxygen or a peroxygen compound is used to initiate polymerizing and/or crosslinking reactions. The decomplexing agent reacts with the base to liberate the organoborane from the organoborane-base complex. In the presence of oxygen, the organoborane reacts with oxygen and subsequently fragments to generate free-radical species some of which initiate polymerization of any free-radically polymerizable ethylenically-unsaturated compounds that may be present. If any of the free-radically polymerizable ethylenically-unsaturated compounds include more than one-free-radically polymerizable ethylenically-unsaturated group, then typically crosslinked polymeric materials are produced.

Adhesive compositions according to the present disclosure may include at least two parts (i.e., they are multi-part polymerizable compositions), and preferably, two parts. The at least two-part compositions according to the present disclosure include a part A and a part B. Individually, parts A and B have good stability, but when combined stability is lost and curing is initiated.

The part A composition includes an organoborane-base complex. The part B includes a decomplexing agent for the organoborane-base complex. The polymerizable composition (i.e., the part A composition and/or the part B composition) further includes a free-radically polymerizable ethylenically-unsaturated component in part B.

Organoborane-Base Complex

The organoborane-base complex is a latent form of an organoborane which is liberated upon decomplexing the base with a compound that reacts with the base, such as an acid or its equivalent. The free organoborane is an initiator capable of initiating free-radical polymerization of polymerizable monomer(s) to form a polymer that can be useful as an adhesive, sealant, encapsulant, and potting resin, for example.

The organoborane portion of the organoborane-base complex is shown in Formula I (below):

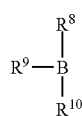
(I)

wherein $R^8$, $R^9$, and $R^{10}$ are organic groups (typically having 30 atoms or less, or 20 atoms or less, or 10 atoms or less). In certain embodiments of Formula I, $R^8$ represents an alkyl group having from 1 to 10 carbon atoms, or from 1 to 6 carbon atoms, or from 1 to 5 carbon atoms, or from 1 to 4 carbon atoms, or from 2 to 4 carbon atoms, or from 3 to 4 carbon atoms.

In certain embodiments of Formula I, $R^9$ and $R^{10}$ independently represent (i.e., they may be the same or different): alkyl groups having 1 to 10 carbon atoms (or from 1 to 6 carbon atoms, or from 1 to 5 carbon atoms, or from 1 to 4 carbon atoms, or from 2 to 4 carbon atoms, or from 3 to 4 carbon atoms); cycloalkyl groups having 3 to 10 carbon atoms; aryl groups having from 6 to 12 carbon atoms (e.g., phenyl); or aryl groups having from 6 to 12 carbon atoms (e.g., phenyl) substituted with alkyl groups having 1 to 10 carbon atoms (or from 1 to 6 carbon atoms, or from 1 to 5 carbon atoms, or from 1 to 4 carbon atoms, or from 2 to 4 carbon atoms, or from 3 to 4 carbon atoms), or cycloalkyl groups having 3 to 10 carbon atoms. Any two of $R^8$, $R^9$, and $R^{10}$ groups may optionally be part of a ring (e.g., two groups can combine to form a ring).

The organoborane initiator is complexed with a basic complexing agent (i.e., a base that complexes with the organoborane) to form a stable organoborane-base complex. The organoborane-base complex may be represented by Formula II (below):

wherein $R^8$, $R^9$, and $R^{10}$ are as previously defined, and Cx represents a complexing agent selected from a compound having one or more amine groups and optionally one or more alkoxyl groups; and v is a positive number. The value of v is selected so as to render the organoborane-base complex stable under ambient conditions. For example, when the organoborane-base complex is stored in a capped vessel at about 20 to 22° C. and under otherwise ambient conditions (i.e., the vessel is capped in an ambient air environment and not under vacuum or an inert atmosphere), the complex remains useful as an initiator for at least two weeks. Preferably, the complexes may be readily stored under these conditions for many months, and up to a year or more. In certain embodiments the value of v is typically at least 0.1, or at least 0.3, or at least 0.5, or at least 0.8, or at least 0.9 and, up to 2, or up to 1.5, or up to 1.2. In some embodiments, v is in a range of 0.1 to 2, or in a range of 0.5 to 1.5, or in a range of 0.8 to 1.2, or in a range of 0.9 to 1.1, or 1.

Herein, in Formulas I and II, an alkyl group may be straight chain or branched.

In certain embodiments, a ring formed by two groups of $R^8$, $R^9$, and $R^{10}$ may be bridged by the boron atom in Formula I or Formula II.

In certain embodiments, the organoborane-base complex does not include a thiol group.

Exemplary preferred organoboranes of the organoborane-base complexes are trimethylborane, triethylborane, tri-n-propylborane, triisopropylborane, tri-n-butylborane, triisobutylborane, and tri-sec-butylborane.

Useful basic complexing agents (Cx) include, for example, amines, aminoalcohols, aminoethers and compounds that contain a combination of such functionality (e.g., an amino group and an alkoxyl group). Sufficient complexing agent is provided to ensure stability of the organoborane-base complex under ambient conditions. Insufficient complexing agent could leave free organoborane, a material that tends to be pyrophoric. In practice, to ensure stability of the complex at ambient conditions, the compound that serves as the complexing agent is often in excess, i.e., some of the compound is free or not complexed in the composition. The amount of excess basic complexing agent is chosen to ensure stability of the complex under ambient conditions while still achieving desired performance such as cure rate of the polymerizable composition and mechanical properties of the cured composition. For example, there may be up to 100 percent molar excess, or up to 50 percent molar excess, or up to 30 percent molar excess of the basic complexing agent relative to the organoborane. Often, there is 10 to 30% molar excess of the basic complexing agent relative to the organoborane.

Useful basic complexing agents include, for example, amines and aminoethers. The amine compounds may have primary and/or secondary amino group(s), for example.

Amine complexing agents (Cx) may be provided by a wide variety of materials having one or more primary (typically preferred) or secondary amine groups, including blends of different amines. Amine complexing agents may be a compound with a single amine group or may be a polyamine (i.e., a material having multiple amine groups such as two or more primary, secondary, or tertiary amine groups). Suitable polyamines preferably have at least one amine group that is a primary and/or secondary amine group.

The amine complexing agent includes (preferably consists essentially of, or even consists of) one or more compounds represented by Formula III (below):

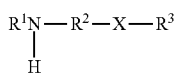
(III)

wherein $R^1$, $R^2$, $R^3$ and X are as previously defined.

In some preferred embodiments, $R^1$ is H, methyl, or ethyl. In some preferred embodiments, $R^2$ is ethan-1,2-diyl (i.e., ethylene) or propan-1,3-diyl (i.e., 1,3-propylene). In those embodiments wherein X is

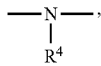

$R^3$ is preferably H, methyl, ethyl, or an aminoalkyl group having from 2 to 6 carbon atoms (e.g., 2-aminoethyl, 3-aminopropyl, 4-aminobutyl). In those embodiments wherein X is O (i.e., an oxygen atom), $R^3$ preferably represents an ethyl or methyl. In some preferred embodiments, $R^2$ represents an alkylene group having from 2 to 10 carbon atoms (e.g., ethan-1,2-diyl or propylene-1,3-diyl, or cyclohexylethane-1,2-diyl). It is envisaged that the above preferred embodiments of $R^1$, $R^2$, $R^3$, $R^4$, and X may be combined in any combination or subcombination.

The organoborane-base complex may be readily prepared using known techniques, as described, for example, in U.S. Pat. No. 5,616,796 (Pocius et al.), U.S. Pat. No. 5,621,143 (Pocius), U.S. Pat. No. 6,252,023 (Moren), U.S. Pat. No. 6,410,667 (Moren), and U.S. Pat. No. 6,486,090 (Moren).

Suitable organoborane-amine complexes are available from suppliers such as BASF and AkzoNobel. TEB-DAP (triethylborane-1,3-diaminopropane (or 1,3-propanediamine) complex), TnBB-MOPA (tri-n-butylborane-3-methoxypropylamine complex), TEB-DETA (triethylborane-diethylenetriamine complex), TnBB-DAP (tri-n-butylborane-1,3-diaminopropane complex), and TsBB-DAP (tri-sec-butylborane-1,3-diaminopropane complex) are all available from BASF (Ludwigshafen, Germany). TEB-HMDA (triethylborane-hexamethylenediamine (also 1,6-hexanediamine or 1,6-diaminohexane) complex) is available from AkzoNobel, Amsterdam, The Netherlands.

The organoborane-base complex is generally employed in an effective amount, which is an amount large enough to permit reaction (i.e., curing by polymerizing and/or cross-linking) to readily occur to obtain a polymer of sufficiently high molecular weight for the desired end use. If the amount of organoborane produced is too low, then the reaction may be incomplete. On the other hand, if the amount is too high, then the reaction may proceed too rapidly to allow for effective mixing and use of the resulting composition. Useful rates of reaction will typically depend at least in part on the method of applying the composition to a substrate. Thus, a faster rate of reaction may be accommodated by using a high speed automated industrial applicator rather than by applying the composition with a hand applicator or by manually mixing the composition.

Within these parameters, an effective amount of the organoborane-base complex is an amount that preferably provides at least 0.003 percent by weight of boron, or at least 0.008 percent by weight of boron, or at least 0.01 percent by weight of boron. An effective amount of the organoborane-base complex is an amount that preferably provides up to 1.5 percent by weight of boron, or up to 0.5 percent by weight of boron, or up to 0.3 percent by weight of boron. The percent by weight of boron in a composition is based on the total weight of the polymerizable material.

Alternatively stated, an effective amount of the organoborane-base complex is at least 0.1 percent by weight, or at least 0.5 percent by weight. An effective amount of the organoborane-base complex is up to 10 percent by weight, or up to 5 percent by weight, or up to 3 percent by weight. The percent by weight of boron in a composition is based on the total weight of the polymerizable material.

Reactive Diluent

The reactive diluent may include at least one vinyl ether represented by Formula IV (below):

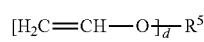
(IV)

wherein $R^5$ represents a d-valent organic group having from 1 to 18 carbon atoms, wherein the organic group is composed of carbon, hydrogen, and optionally oxygen; and wherein d represents 1, 2, 3, or 4. In some embodiments, $R^5$ has from 1 to 12 carbon atoms, from 1 to 8 carbon atoms, from 1 to 6 carbon atoms, or even from 1 to 4 carbon atoms. Preferably, the vinyl ether(s) is/are liquids at ambient temperatures, although this is not a requirement. Examples include: include methyl vinyl ether, ethyl vinyl ether, n-propyl vinyl ether, isopropyl vinyl ether, n-butyl vinyl ether, isobutyl vinyl ether, hexyl vinyl ether, isooctyl vinyl ether, decyl vinyl ether, isodecyl vinyl ether, and octadecyl vinyl ether, 1,4-cyclohexanedimethanol divinyl ether, butanediol divinyl ether, ethylene glycol divinyl ether, propylene glycol divinyl ether, diethylene glycol divinyl ether, dipropylene glycol divinyl ether, triethylene glycol divinyl ether, tripropylene glycol divinyl ether, tetraethylene glycol divinyl ether, tetrapropylene glycol divinyl ether, trimethylolpropane trivinyl ether, glycerol trivinyl ether, and pentaerythritol tetravinyl ether.

In some preferred embodiments, $R^5$ comprises one or more catenary oxygen atoms spaced along an alkylene chain (wherein d=2), for example, as represented by Formula V (below):

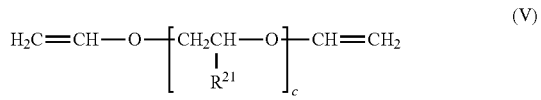

(V)

wherein $R^{21}$ represents H or methyl, and c represents an integer greater than or equal to 1. Examples include ethylene glycol divinyl ether, propylene glycol divinyl ether, diethylene glycol divinyl ether, dipropylene glycol divinyl ether, triethylene glycol divinyl ether, tripropylene glycol divinyl ether, tetraethylene glycol divinyl ether, and tetrapropylene glycol divinyl ether.

In some embodiments, $R^5$ is trivalent or tetravalent (i.e., d=3 or 4). Examples of useful vinyl ethers with trivalent and tetravalent $R^5$ groups include pentaerythritol tetravinyl ether, trimethylolpropane trivinyl ether, and glycerol trivinyl ether.

In some embodiments, useful vinyl ethers wherein d=1 are represented by Formula VI (below):

(VI)

wherein $R^{22}$ represents an aliphatic group having from 1 to 18 carbon atoms (preferably 1 to 12 carbon atoms, more preferably 1 to 6 carbon atoms, and even more preferably 1 to 4 carbon atoms). Examples of suitable vinyl ethers include methyl vinyl ether, ethyl vinyl ether, n-propyl vinyl ether, isopropyl vinyl ether, n-butyl vinyl ether, isobutyl vinyl ether, hexyl vinyl ether, isooctyl vinyl ether, decyl vinyl ether, isodecyl vinyl ether, and octadecyl vinyl ether.

Useful reactive diluents also include vinylpolysiloxane represented by Formula VII (below):

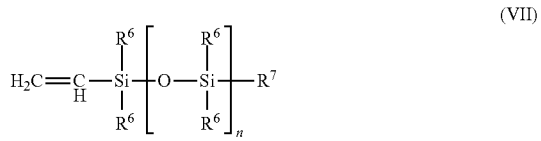

(VII)

wherein each $R^6$ independently represents an alkyl group having from 1 to 6 carbon atoms (preferably methyl or ethyl), or a phenyl group; and $R^7$ represents an alkyl group having from 1 to 18 carbon atoms (preferably from 1 to 12 carbon atoms, and more preferably from 1 to 8 carbon atoms) or a vinyl group; and n is a positive integer in the range of from 1 to 10 (preferably 1 to 3). Examples of useful compounds of Formula VII include 1,3-divinyltetramethyldisiloxane, 1,5-divinylhexamethyltrisiloxane, and 1,7-divinyloctamethyltetrasiloxane.

Combinations of any or all of the above reactive diluents may also be used.

At least a portion of the reactive diluent preferably are capable of copolymerizing (e.g., with free-radically polymerizable ethylenically-unsaturated compound(s) in the Part B composition) with other compounds in the adhesive composition when the Part A composition is mixed with the Part B composition.

Decomplexing Agents

As used herein, the term "decomplexing agent" refers to a compound capable of liberating the organoborane from its complexing agent, thereby enabling initiation of the reaction (curing by polymerizing and/or crosslinking) of the polymerizable material of the composition. Decomplexing agents may also be referred to as "activators" or "liberators" and these terms may be used synonymously herein.

Compounds that react quickly with the base or the organoborane-base complex under mild temperatures are particularly effective decomplexing agents. These may include mineral acids, Lewis acids, carboxylic acids, acid anhydrides, acid chlorides, sulfonyl chlorides, phosphonic acids, isocyanates, aldehydes, 1,3-dicarbonyl compounds, acrylates, and epoxies.

In certain embodiments, the decomplexing agent may be attached to solid particles such as silica, titanium dioxide, alumina, calcium carbonate, and carbon black.

Suitable decomplexing agents include amine-reactive compounds. The amine-reactive compound liberates organoborane by reacting with the amine, thereby removing the organoborane from chemical attachment with the amine. A wide variety of materials may be used to provide the amine-reactive compound including combinations of different materials. Desirable amine-reactive compounds are those materials that can readily form reaction products with amines at or below room temperature so as to provide a composition such as an adhesive that can be easily used and cured under ambient conditions.

General classes of useful amine-reactive compounds include mineral acids (e.g., hydrochloric acid, sulfuric acid, phosphoric acid, and silicic acid), Lewis acids (e.g., $SnCl_4$ or $TiCl_4$), carboxylic acids, acid anhydrides (i.e., organic compounds that have two acyl groups bound to the same oxygen atom), acid chlorides, sulfonyl chlorides, phosphonic acids, phosphinic acids, isocyanates, aldehydes, 1,3-dicarbonyl compounds, acrylates, and epoxies. Compounds that react quickly with amines at mild temperatures, such as acids, acid anhydrides, acid chlorides, sulfonyl chlorides, and isocyanates, are particularly effective decomplexing agents.

In addition, strong acids, such as many mineral acids, may degrade the components of the polymerizable composition before or after reaction, and also can degrade or corrode substrates that the composition may contact. Owing to these facts, carboxylic acids, acid anhydrides, aldehydes, isocyanates, phosphonic acids, and 1,3-dicarbonyl compounds, such as barbituric acid, dimedone, and their derivatives, are typically more versatile and preferred decomplexing agents.

Useful carboxylic acids include those having the general formula $R^{11}$—$CO_2H$, wherein $R^{11}$ represents hydrogen or a monovalent organic group. Preferably $R^{11}$ is an aliphatic group having 1 to 20 (preferably 1 to 8) carbon atoms, or an aryl group having 6 to 10 (preferably 6 to 8) carbon atoms. The aliphatic groups may comprise a straight chain or they may be branched, and may be saturated or unsaturated. The aryl groups may contain substituents such as alkyl, alkoxy, or halogen groups. Suitable acids of this type include acrylic acid, methacrylic acid, acetic acid, nonanoic acid, benzoic acid, and p-methoxybenzoic acid.

Useful carboxylic acids also include those having the general formula $R^{12}$—$CO_2H$, wherein $R^{12}$ may be a straight or branched chain, saturated or unsaturated aliphatic group of from 9 to 36 carbon atoms, preferably from 11 to 24 carbon atoms, and more preferably from 15 to 24 carbon atoms.

Yet other carboxylic acids useful as the amine-reactive compound include dicarboxylic acids and carboxylic acid esters. Such compounds may be represented by Formula VIII (below):

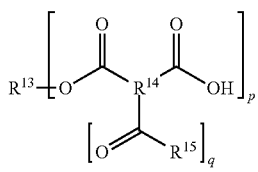

(VIII)

wherein $R^{13}$ is hydrogen, a monovalent organic group (typically having 18 atoms or less, or 8 atoms or less), or a multivalent organic group (typically having 30 atoms or less, or 10 atoms or less). The $R^{14}$ group is a multivalent (i.e., (q+2)-valent) organic group (typically having 8 atoms or less, or 4 atoms or less). The $R^{15}$ group is hydrogen or a monovalent organic group (typically having 18 atoms or less, or 8 atoms or less). The value of q is 0, 1, or 2, and the value of p is greater than or equal to one, preferably 1 to 4, more preferably 1 or 2.

In some embodiments, the carboxylic acids can be represented by Formula IX (below):

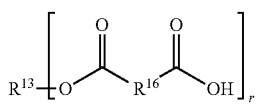

(IX)

wherein $R^{13}$ is as defined above and r is greater than or equal to one, preferably 1 to 4, more preferably 1 or 2. The $R^{16}$ group is a single bond or a divalent organic group (preferably having from 1 to 40 carbon atoms, more preferably from 1 to 10 carbon atoms or 1 to 6 carbon atoms). The organic group is often an alkylene or alkenediyl (divalent radical of an alkene) or an arylene. When $R^{13}$ is hydrogen and r is one, the resulting compounds of Formula IX are dicarboxylic acids. In some embodiments, $R^{13}$ is an alkyl and r is equal to 1. In other embodiments, $R^{13}$ is an alkylene and r is equal to 2. Useful dicarboxylic acids include oxalic acid, malonic acid, succinic acid, glutaric acid, adipic acid, maleic acid, fumaric acid, phthalic acid, isophthalic acid, terephthalic acid, and dimer acid.

Polydiorganosiloxanes that contain carboxylic acid groups are also useful, such as Shin-Etsu Chemical Co. Ltd. X-22-3710 that has a carboxylic acid group at one of the terminal ends of the silicone chain, and X-22-162C that has a carboxylic acid group at each of the two termini.

Compounds that easily generate carboxylic acids upon reaction with water or moisture, i.e., are easily hydrolyzed by water to form carboxylic acids, such as vinyltriacetoxysilane and (meth)acryloxypropyltriacetoxysilane are also useful.

Also preferred as amine-reactive compounds that can serve as decomplexing agents are materials having at least one anhydride group, such materials preferably represented by one of the following formulas (Formula X and Formula XI, below):

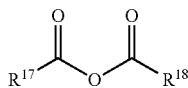

(X)

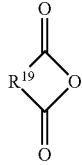

(XI)

wherein $R^{17}$ and $R^{18}$ are organic groups which independently may be aliphatic, cycloaliphatic, or aromatic. Preferred aliphatic and cycloaliphatic groups include 1 to 17 carbon atoms, more preferably 2 to 9 carbon atoms. The aliphatic and cycloaliphatic groups can be saturated or unsaturated. Preferred aromatic groups include phenyl, optionally substituted with 1 to 4 carbon atom aliphatic groups. The $R^{19}$ group is a divalent organic group that completes a cyclic structure with the anhydride group to form, for example, a 5- or 6-membered ring. $R^{19}$ may be aliphatic, cycloaliphatic, aromatic, or a combination. The aliphatic and cycloaliphatic groups can be saturated or unsaturated. Preferably, $R^{19}$ is an aliphatic group having 2 to 20, more preferably 2 to 12 carbon atoms. The $R^{19}$ group may also contain heteroatoms such as oxygen or nitrogen provided that any heteroatom is not adjacent to the anhydride functionality. The $R^{19}$ group may also be part of a cycloaliphatic or aromatic fused ring structure, either of which may be optionally substituted with aliphatic groups. $R^{19}$ may be substituted with one or more carboxylic acid groups, any two of which, when on adjacent carbons (i.e., covalently bonded carbons) can be cyclized to form another anhydride group.

Suitable anhydrides of Formula XI are propionic anhydride, methacrylic anhydride, hexanoic anhydride, decanoic anhydride, lauric anhydride, and benzoic anhydride. Suitable anhydrides of Formula XII are maleic anhydride, succinic anhydride, methylsuccinic anhydride, 2-octen-1-ylsuccinic anhydride, 2-dodecen-1-ylsuccinic anhydride, dodecenylsuccinic anhydride (mixture of isomers), cyclohexanedicarboxylic anhydride, cis-5-norbornene-endo-2,3-dicarboxylic anhydride, methyl-5-norbornene-2,3-dicarboxylic anhydride, phthalic anhydride, trimellitic anhydride, and pyromellitic anhydride. The presence of an ethylenically-unsaturated group in the anhydride-functional amine reactive compound, such as would be the case for maleic anhydride, may permit the same to react with the other ethylenically-unsaturated components.

Other useful amine-reactive compounds having at least one anhydride group are copolymers of maleic anhydride, such as the copolymers of maleic anhydride and styrene, the copolymers of maleic anhydride and ethylene or -olefins, and the copolymers of maleic anhydride and (meth)acrylates. Also, polymeric materials in which maleic anhydride has been grafted onto the polymer to form, for example, succinic anhydride-functional polymers are suitable. Polydiorganosiloxanes that contain anhydrides may also be useful, such as Gelest, Inc. succinic anhydride-terminated polydimethylsiloxane, DMS-Z21.

Suitable aldehydes useful as the amine-reactive compounds that serve as decomplexing agents may include those represented by Formula XII (below):

(XII)

wherein $R^{20}$ is a monovalent organic group such as, for example, an alkyl group having 1 to 10 carbon atoms (in some embodiments, 1 to 4 carbon atoms), or an aryl group having 6 to 10 carbon atoms (in some embodiments, 6 to 8 carbon atoms). In this formula, the alkyl groups may be straight or branch-chained, and may contain substituents such as halogen, hydroxy, and alkoxy. The aryl groups may contain substituents such as halogen, hydroxy, alkoxy, alkyl, and nitro. One preferred $R^{20}$ group is aryl. Exemplary compounds of this type include: benzaldehyde; o-, m- and p-nitrobenzaldehyde; 2,4-dichlorobenzaldehyde; p-tolylaldehyde; and 3-methoxy-4-hydroxybenzaldehyde. Blocked aldehydes such as acetals and dialdehydes, may also be used.

Other suitable decomplexing agents may include 1,3-dicarbonyl compounds (e.g., beta-ketones), for example, as described in U.S. Pat. No. 6,849,569 (Moren). Exemplary 1,3-dicarbonyl compound decomplexing agents include methyl acetoacetate, ethyl acetoacetate, t-butyl acetoacetate, 2-methacryloyloxyethyl acetoacetate, diethylene glycol bis(acetoacetate), polycaprolactone tris(acetoacetate), polypropylene glycol bis(acetoacetate), poly(styrene-co-allyl acetoacetate), N,N-dimethylacetoacetamide, N-methylacetoacetamide, acetoacetanilide, ethylene bis(acetoacetamide), polypropylene glycol bis(acetoacetamide), acetoacetamide, and acetoacetonitrile. Preferred 1,3-dicarbonyl compounds include dimedone, barbituric acid and their derivatives (e.g., 1,3-dimethylbarbituric acid, 1-phenyl-5-benzylbarbituric acid, and 1-ethyl-5-cyclohexyl-barbituric acid).

Examples of suitable isocyanate decomplexing agents include, but are not limited to, polyfunctional isocyanates, such as isophorone diisocyanate, hexamethylene diisocyanate, methylene diphenyl diisocyanate, toluene diisocyanate, and their prepolymers. Additionally, 2-isocyanatoethyl methacrylate alone or its copolymers with, e.g., other (meth)acrylates are suitable decomplexing agents.

Examples of suitable phosphonic acid decomplexing agents include vinylphosphonic acid, phenylphosphonic acid, methylphosphonic acid, and octadecylphosphonic acid.

Preferred compounds capable of decomplexing the organoborane-amine complex include, for example, a carboxylic acid, an acid anhydride, an aldehyde, an isocyanate, a phosphonic acid, or a 1,3-dicarbonyl.

The decomplexing agent is typically used in an effective amount (i.e., an amount effective to promote reaction (i.e., curing by polymerizing and/or crosslinking) by liberating the initiator from its complexing agent, but without materially adversely affecting desired properties of the ultimate composition). As recognizable to one of ordinary skill in the art, too much of the decomplexing agent may cause reaction to proceed too quickly. However, if too little decomplexing agent is used, the rate of reaction may be too slow and the resulting polymers may not be of adequate molecular weight for certain applications. A reduced amount of decomplexing agent may be helpful in slowing the rate of reaction if it is otherwise too fast. Thus, within these parameters, the decomplexing agent is typically provided in an amount such that the molar ratio of amine-reactive groups in the decomplexing agent(s) to amino groups in the complexing agent(s) is in the range of 0.5:1.0 to 10.0:1.0, preferably in the range of 0.5:1.0 to 4.0:1.0, and more preferably 1.0:1.0, although this is not a requirement.

Free-Radically Polymerizable Ethylenically-Unsaturated Compounds

Suitable free-radically polymerizable ethylenically-unsaturated compounds are those compounds (e.g., monomer, oligomer, polymerizable polymer) that include at least one ethylenically-unsaturated group.

Preferred ethylenically-unsaturated compounds include (meth)acrylates, and (meth)acrylamides.

Suitable free-radically polymerizable ethylenically-unsaturated monomers are typically ethylenically-unsaturated compounds. Preferably, the part B includes at least one (meth)acrylic monomer, most preferably at least one methacrylic monomer. As used herein the terms "(meth)acrylate" and "(meth)acrylic" and the plural forms thereof are meant to include acrylate and/or methacrylate species of the designated compound. For example, the term "ethyl (meth)acrylate" is meant to include ethyl acrylate and/or ethyl methacrylate. Particularly preferred are (meth)acrylic acid derivatives such as those including esters and/or amides. Suitable (meth)acrylic acid derivatives are, for example, the (meth)acrylic esters of monohydric alcohols, particularly alkanols having from 1 to 12 carbon atoms, such as methyl (meth)acrylate, ethyl (meth)acrylate, butyl (meth)acrylate, n-hexyl (meth)acrylate, cyclohexyl (meth)acrylate, isooctyl (meth)acrylate, isobornyl (meth)acrylate, isodecyl (meth)acrylate, ethylhexyl (meth)acrylate; the (meth)acrylic esters of monohydric alcohols further including heteroatoms, such as tetrahydrofurfuryl (meth)acrylate and 2-ethoxyethyl (meth)acrylate; the (meth)acrylic acid esters of polyhydric alcohols, such as ethylene glycol, diethylene glycol, polyethylene glycol, trimethylolpropane, triethylene glycol, tetraethylene glycol, dipropylene glycol, tripropylene glycol, tetrapropylene glycol, pentapropylene glycol and polypropylene glycol; ethoxylated or propoxylated diphenylolpropane and hydroxy-terminated polyurethanes. (Meth)acrylic acid esters of polyhydric alcohols are hereinafter referred to as oligomeric (meth)acrylates.

Suitable di(meth)acrylates include 1,3-butylene glycol di(meth)acrylate, 1,4-butanediol di(meth)acrylate, 1,6-hexanediol di(meth)acrylate, 1,6-hexanediol mono acrylate monomethacrylate, ethylene glycol di(meth)acrylate, alkoxylated aliphatic di(meth)acrylate, alkoxylated cyclohexanedimethanol di(meth)acrylate, alkoxylated hexanediol di(meth)acrylate, alkoxylated neopentyl glycol di(meth)acrylate, caprolactone modified neopentyl glycol hydroxypivalate di(meth)acrylate, cyclohexanedimethanol di(meth)acrylate, diethylene glycol di(meth)acrylate, dipropylene glycol di(meth)acrylate, ethoxylated (10) bisphenol A di(meth)acrylate, ethoxylated (3) bisphenol A di(meth)acrylate, ethoxylated (30) bisphenol A di(meth)acrylate, ethoxylated (4) bisphenol A di(meth)acrylate, ethoxylated (4) bisphenol A di(meth)acrylate, hydroxypivalaldehyde modified trimethylolpropane di(meth)acrylate, neopentyl glycol di(meth)acrylate, polyethylene glycol (200) di(meth)acrylate, polyethylene glycol (400) di(meth)acrylate, polyethylene glycol (600) di(meth)acrylate, propoxylated neopentyl glycol di(meth)acrylate, tetraethylene glycol di(meth)acrylate, tricyclodecanedimethanol di(meth)acrylate, triethylene glycol di(meth)acrylate, and tripropylene glycol di(meth)acrylate.

Suitable tri(meth)acrylates include glycerol tri(meth)acrylate, trimethylolpropane tri(meth)acrylate, ethoxylated tri(meth)acrylates (for example, ethoxylated (3) trimethylolpropane tri(meth)acrylate, ethoxylated (6) trimethylolpropane tri(meth)acrylate, ethoxylated (9) trimethylolpropane tri(meth)acrylate, ethoxylated (15) trimethylolpropane tri(meth)acrylate, ethoxylated (20) trimethylolpropane tri(meth)acrylate, pentaerythritol tri(meth)acrylate, propoxylated tri(meth)acrylates (for example, propoxylated (3) glyceryl tri(meth)acrylate, propoxylated (5.5) glyceryl tri(meth)acrylate, propoxylated (3) trimethylolpropane tri(meth)acrylate, propoxylated (6) trimethylolpropane tri(meth)acrylate), trimethylolpropane tri(meth)acrylate, and tris(2-hydroxyethyl)isocyanurate tri(meth)acrylate, which is also referred to as tris(2-(meth)acryloyloxyethyl)isocyanurate.

Suitable higher functionality (meth)acrylic compounds include ditrimethylolpropane tetra(meth)acrylate, dipentaerythritol penta(meth)acrylate, ethoxylated (4) pentaerythritol tetra(meth)acrylate, pentaerythritol tetra(meth)acrylate, and caprolactone modified dipentaerythritol hexa(meth)acrylate.

Suitable oligomeric polymerizable (meth)acrylic compounds include urethane (meth)acrylates, polyester (meth)acrylates, polybutadiene (including hydrogenated polybutadiene) (meth)acrylates, and epoxy (meth)acrylates.

Suitable (meth)acrylates include (meth)acrylic acid esters of polyhydric alcohols, such as, for example, ethylene glycol, diethylene glycol, polyethylene glycol, trimethylolpropane, triethylene glycol, tetraethylene glycol, dipropylene glycol, tripropylene glycol, tetrapropylene glycol, pentapropylene glycol and polypropylene glycol; ethoxylated or propoxylated diphenylolpropane and hydroxy-terminated polyurethanes.

Suitable ethylenically-unsaturated compounds include monofunctional and polyfunctional (meth)acrylamide monomers. As used herein the terms "(meth)acrylamide" and the plural form thereof are meant to include acrylamide and/or methacrylamide species of the designated compound.

Suitable monofunctional (meth)acrylamides include acrylamide, methacrylamide, N-(hydroxymethyl)acrylamide, N-(hydroxyethyl)acrylamide, N-(isobutoxymethyl)acrylamide, N-(3-methoxypropyl)acrylamide, N-{tris(hydroxymethyl)methyl]acrylamide, N-isopropylacrylamide, N-[3-(dimethylamino)propyl]methacrylamide, and diacetone acrylamide.

Suitable polyfunctional (meth)acrylamides include 1,4-bis((meth)acryoyl)piperazine, bis-(meth)acrylamide (also referred to as N,N'-methylenedi(meth)acrylamide), N,N'-(1,2-dihydroxyethylene)bis(meth)acrylamide, as well as polyfunctional (meth)acrylamides that can be formed from reaction of (meth)acrylic acid or its acid chloride with primary and/or secondary amines, such as 1,3-diaminopropane, N,N'-dimethyl-1,3-diaminopropane, 1,4-diaminobutane, polyamidoamines, and polyoxyalkylenepolyamines.

Various combinations of the polymerizable ethylenically-unsaturated compounds may be used. Preferred combinations include miscible mixtures.

Optional Additives

The multi-part compositions can include other optional additives. These optional additives can be in part A, part B, or in any other part. Peroxygen compounds may be particularly useful additive for decreasing the cure time in applications that require relatively thick coating, for example, such as those having a coating thickness greater than 0.25 mm, or greater than 0.50 mm, or greater than 1.00 mm. Particularly useful peroxygen compounds are peroxides that have half-lives of 10 hours at temperatures of approximately 90° C. or greater, such as 1,1-di(tert-butylperoxy)cyclohexane, tert-amylperoxy 2-ethylhexyl carbonate, tert-amyl peroxyacetate, 2,2-di(tert-butylperoxy)butane, tert-butylperoxy isopropyl carbonate, dicumyl peroxide, tert-butyl peroxy-3,5,5-trimethylhexanoate, 2,5-dimethyl-2,5-di(tert-butylperoxy)hexane, di-tert-butyl peroxide, 2,5-dimethyl-2,5-di(tert-butylperoxy)hexyne-3, and tert-butyl cumyl peroxide.

Another particularly useful additive is a thickener, such as medium (e.g., 40,000 grams/mole) molecular weight poly (butyl methacrylate) that may generally be incorporated in an amount of up to 50 percent by weight, based on the total weight of the polymerizable monomers. Thickeners may be employed to increase the viscosity of the resulting composition to a more easily applied viscous syrup-like consistency.

Yet another particularly useful additive is an elastomeric material. These materials can improve the fracture toughness of compositions made therewith, which can be beneficial when, for example, bonding stiff, high yield strength materials (e.g., metal substrates that do not mechanically absorb energy as easily as other materials, such as flexible polymeric substrates). Such additives can generally be incorporated in an amount of up to 50 percent by weight, based on the total weight of the composition.

Core-shell polymers can also be added to modify spreading and flow properties of the composition. These enhanced properties may be manifested by a reduced tendency for the composition to leave an undesirable "string" upon dispensing from a syringe-type applicator, or sag or slump after having been applied to a vertical surface. Accordingly, use of more than 20 percent by weight, based on total weight of the composition, of a core-shell polymer additive may be desirable for achieving improved sag-slump resistance. Core-shell polymers can also improve the fracture toughness of compositions made therewith, which can be beneficial when, for example, bonding stiff, high yield strength materials (e.g., metal substrates that do not mechanically absorb energy as easily as other materials, such as flexible polymeric substrates).

Small amounts of inhibitors, such as hydroquinone monomethyl ether, 2,6-di-(tert-butyl-1,2-dihydroxybenzene, 2,6-di-(tert-butyl)-4-methylphenol, pyrogallic acid, and tris (N-nitroso-N-phenylhydroxylamine) aluminum salt may be used in polymerizable compositions, for example, to prevent reaction or reduce degradation of the polymerizable monomers during storage. Inhibitors may be added in an amount that does not materially affect the rate of curing or the ultimate properties of polymers made therewith. Accordingly, inhibitors are generally useful in amounts of 100-30,000 parts per million (ppm) based on the total weight of polymerizable monomers in a polymerizable composition.

Other possible additives include UV absorbers and light stabilizers, flame retardants, plasticizers, adhesion promoters, non-reactive diluents (e.g., non-reactive organic solvents), non-reactive colorants, tackifiers, fillers (e.g., carbon black, hollow glass/ceramic beads, silica, titanium dioxide, calcium carbonate, solid glass/ceramic spheres, electrically and/or thermally conductive particulate, such as metal particles, graphite, alumina trihydrate (also referred to as aluminum hydroxide), alumina, boron nitride, and silicon carbide, glass/ceramic fiber, carbon fiber, antistatic compounds, and chalk), and the like. The various optional additives are employed in any amount, but generally amounts that do not significantly adversely affect the curing process or the desired properties of polymers made therewith.

Combinations

Adhesive compositions according to the present disclosure may be provided as at least a part A and a part B, with these parts being mixed prior to use of the composition (e.g., application of the composition to a substrate). In this way, activation of the organoborane can be delayed until parts A and B are combined.

More specifically, compositions of the present disclosure are multi-part polymerizable compositions that include at least two parts: a part A composition that includes an organoborane-base complex; and a part B composition that includes a decomplexing agent. These two parts are kept separate until reaction is desired. The polymerizable components can be in part A, part B, or another part distinct from parts A and B. Various combinations can be envisioned.

For a two-part composition in which part A includes an organoborane-base complex and reactive diluent (i.e., vinyl ether or vinyl-terminated polysiloxane as described hereinabove) and part B includes a decomplexing agent and free-radically polymerizable ethylenically-unsaturated component(s) other than the reactive diluent. Preferably, part B contains all of the free-radically polymerizable ethylenically-unsaturated component(s) other than the reactive diluent; however, this is not a requirement.

Two-part compositions are generally preferred due to cost considerations, as is long shelf life.

When a two-part composition is used, in addition to separating the organoborane-base complex from the decomplexing agent, stability of the combinations with the other components should be considered.

Methods

For multi-part adhesive compositions such as those described in the present disclosure to be most easily used in commercial and industrial environments, the ratio at which the various parts are combined should be a convenient whole number. This facilitates application of the composition with conventional, commercially available dispensers. Such dispensers are shown in U.S. Pat. No. 4,538,920 (Drake) and U.S. Pat. No. 5,082,147 (Jacobs) and are available from ConProTec, Inc. (Salem, N.H.) under the trade designation MIXPAC, and are sometimes described as dual syringe-type applicators.

Typically, for two-part compositions, such dispensers use a pair of tubular receptacles arranged side-by-side with each tube being intended to receive one of the two parts of the composition. Two plungers, one for each tube, are simultaneously advanced (e.g., manually or by a hand-actuated ratcheting mechanism) to evacuate the contents of the tubes into a common, hollow, elongated mixing chamber that may also contain a static mixer to facilitate blending of the two parts. The blended composition is extruded from the mixing chamber, typically onto a substrate. Once the tubes have been emptied, they can be replaced with fresh tubes and the application process continued.

The ratio at which the parts of the composition are combined is controlled by the diameter of the tubes. Each plunger is sized to be received within a tube of fixed diameter, and the plungers are advanced into the tubes at the same speed. A single dispenser is often intended for use with a variety of different compositions and the plungers are sized to deliver the parts of the composition at a convenient mix ratio. For two-part compositions, some common mix ratios are 1:1, 1:2, 1:4, and 1:10 volume:volume.

If the parts of the composition are combined in an odd mix ratio (e.g., 3.5:100), then the ultimate user would probably manually weigh the parts of the composition. Thus, for best commercial and industrial utility and for ease of use with currently available dispensing equipment, the parts, particularly two parts, of the composition should be capable of being combined in a common whole number mix ratio such as, for example, 1:1, 1:2, 1:4, and 1:10.

Once the parts have been combined, the composition should preferably be used within a period of time less than or equal to the work-life of the composition. Once the parts are combined, e.g., part A and part B, the reaction occurs under mild conditions, and preferably under ambient conditions. In this context, "mild conditions" include 0 to 50° C., 10 to 50° C., 19 to 50° C., or 19 to 40° C., or 19 to 30° C., or 19 to 25° C. Ambient conditions include room temperature. If desired, heat can be applied to accelerate the reaction.

Once the parts are combined, e.g., part A and part B, the reaction occurs within hours. For example, the time for curing the composition can typically range from seconds to 120 hours under ambient conditions. Post-curing at an elevated temperature may also be used if desired. Although, relatively quick reaction (polymerization and/or crosslinking) can occur within 12 hours, certain embodiments do not cure that quickly. Such compositions are useful in situations that do not require such rapid cure.

Preferably, Part A and Part B mix with each other (e.g., are soluble in each other) to form a homogenous liquid composition; however, this is not a requirement. In some cases, Part A and Part B may be immiscible with each other.

Select Embodiments of the Present Disclosure

In a first embodiment, the present disclosure provides a two-part adhesive composition comprising:
(I) a Part A composition comprising:
(a) a complex of an organoborane and an amine complexing agent, wherein the amine complexing agent is represented by the formula

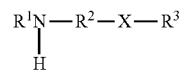

wherein:
$R^1$ represents H or an alkyl group having from 1 to 4 carbon atoms;
$R^2$ represents an alkylene group having from 2 to 12 carbon atoms;
$R^3$ represents H, an alkyl group having from 1 to 4 carbon atoms, or an aminoalkyl group having from 2 to 6 carbon atoms; and
X represents O or

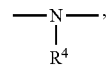

wherein $R^4$ represents H or an alkyl group having from 1 to 4 carbon atoms; and
(b) reactive diluent selected from the group consisting of components:
(i) at least one vinyl ether represented by the formula

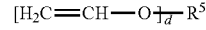

wherein:
$R^5$ represents a d-valent organic group having from 1 to 18 carbon atoms, wherein the organic group is composed of carbon, hydrogen, and optionally oxygen; and
d represents 1, 2, 3, or 4; or (ii) at least one vinylpolysiloxane represented by the formula

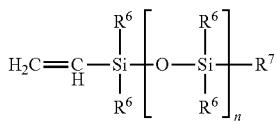

wherein:
each $R^6$ independently represents an alkyl group having from 1 to 6 carbon atoms, or a phenyl group;
$R^7$ represents an alkyl group having from 1 to 18 carbon atoms or a vinyl group; and
n is a positive integer in the range of from 1 to 10, wherein if $R^3$ represents an alkyl group having from 1 to 4 carbon atoms and X represents O, then the reactive diluent is essentially free of component (i); and
(iii) combinations of components (i) and (ii); and
(II) a Part B composition comprising:
a decomplexing agent that decomplexes the organoborane and the amine complexing agent; and
at least one silicon-free free-radically polymerizable ethylenically-unsaturated compound selected from the group consisting of (meth)acrylates, (meth)acrylamides, and combinations thereof,
wherein the two-part adhesive composition is essentially free of organic polythiol compounds.

In a second embodiment, the present disclosure provides a two-part adhesive composition according to the first embodiment, wherein the Part A composition is essentially free of free-radically polymerizable ethylenically-unsaturated compounds other than the reactive diluent.

In a third embodiment, the present disclosure provides a two-part adhesive composition according to the first embodiment, wherein $R^1$ is H.

In a fourth embodiment, the present disclosure provides a two-part adhesive composition according to any of the first to third embodiments, wherein X represents

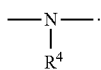

In a fifth embodiment, the present disclosure provides a two-part adhesive composition according to any of the first to fourth embodiments, wherein the component (b) comprises the component (i).

In a sixth embodiment, the present disclosure provides a two-part adhesive composition according to any of the first to fourth embodiments, wherein the component (b) comprises the component (ii).

In a seventh embodiment, the present disclosure provides a two-part adhesive composition according to any of the first to fourth embodiments, wherein the component (b) comprises the components (i) and (ii).

In an eighth embodiment, the present disclosure provides a method of making an adhesive composition, the method comprising combining a Part A composition and a Part B composition to provide the adhesive composition, wherein the part A composition comprises:

(a) a complex of an organoborane and an amine complexing agent, wherein the amine complexing agent is represented by the formula

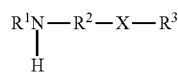

wherein:
$R^1$ represents H or an alkyl group having from 1 to 4 carbon atoms;
$R^2$ represents an alkylene group having from 2 to 12 carbon atoms;
$R^3$ represents H, an alkyl group having from 1 to 4 carbon atoms, or an aminoalkyl group having from 2 to 6 carbon atoms; and
X represents O or

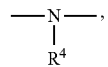

wherein $R^4$ represents H or an alkyl group having from 1 to 4 carbon atoms; and
(b) reactive diluent selected from the group consisting of components:
(i) at least one vinyl ether represented by the formula

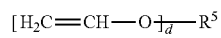

wherein:
$R^5$ represents a d-valent organic group having from 1 to 18 carbon atoms, wherein the organic group is composed of carbon, hydrogen, and optionally oxygen; and
d represents 1, 2, 3, or 4; or
(ii) at least one vinylpolysiloxane represented by the formula

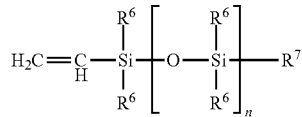

wherein:
each $R^6$ independently represents an alkyl group having from 1 to 6 carbon atoms, or a phenyl group;
$R^7$ represents an alkyl group having from 1 to 18 carbon atoms or a vinyl group; and
n is a positive integer in the range of from 1 to 10; and
(iii) combinations of components (i) and (ii),
wherein if $R^3$ represents an alkyl group having from 1 to 4 carbon atoms and X represents 0, then the reactive diluent is essentially free of the component (i),
wherein the part B composition comprises:
a decomplexing agent that decomplexes the organoborane and the amine complexing agent; and
at least one ethylenically-unsaturated compound selected from the group consisting of (meth)acrylates, (meth)acrylamides, and combinations thereof, and wherein the adhesive composition is essentially free of organic polythiol compounds.

In a ninth embodiment, the present disclosure provides a method according to the eighth embodiment, wherein the Part A composition is essentially free of free-radically polymerizable ethylenically-unsaturated compounds other than the reactive diluent.

In a tenth embodiment, the present disclosure provides a method according to the eighth or ninth embodiment, wherein $R^1$ is H.

In an eleventh embodiment, the present disclosure provides a method according to any one of the eighth to tenth embodiments, wherein X represents

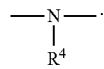

In a twelfth embodiment, the present disclosure provides a method according to any one of the eighth to eleventh embodiments, wherein the component (b) comprises the component (i).

In thirteenth embodiment, the present disclosure provides a method according to any one of the eighth to eleventh embodiments, wherein the component (b) comprises the component (ii).

In a fourteenth embodiment, the present disclosure provides a method according to any one of the eighth to eleventh embodiments, wherein the component (b) comprises the components (i) and (ii).

Objects and advantages of this disclosure are further illustrated by the following non-limiting examples, but the particular materials and amounts thereof recited in these examples, as well as other conditions and details, should not be construed to unduly limit this disclosure.

EXAMPLES

Unless otherwise noted, all parts, percentages, ratios, etc. in the Examples and the rest of the specification are by weight. Table 1 (below) lists materials used in the Examples.

TABLE 1

| ABBREVIATION | DESCRIPTION |
|---|---|
| 1,3-divinyltetramethyl-disiloxane | 1,3-divinyltetramethyldisiloxane, from Gelest, Inc. Tullytown, Pennsylvania |
| 1,4-butanediol divinyl ether | available from Aldrich Chemical Co. |
| allyl butyrate | allyl butyrate from Aldrich Chemical Co. |
| APE | allyl pentaerythritol, from Perstorp Specialty Chemicals AB, Skane, Sweden |
| DP8005 Part A | PART A of SCOTCH-WELD structural plastic adhesive DP8005, translucent, 35 mL Duo-Pak, Part No. 62-2786-0437-6, from 3M Company, Saint Paul, Minnesota, and which contains in part an amine-organoborane complex with polyfunctional aziridine diluent. |
| DP8005 Part B | PART B from 3M SCOTCH-WELD structural plastic adhesive DP8005, translucent, 35 mL Duo-Pak, Part No. 62-2786-0437-6, from 3M Company, and which contains in part succinic anhydride and methacrylate monomers |
| DVE-2 | di(ethylene glycol) divinyl ether, available from Aldrich Chemical Co., Milwaukee, Wisconsin |
| DVE-3 | tri(ethylene glycol) divinyl ether, from Aldrich Chemical Co. |
| N-allylimidazole | available from Aldrich Chemical Co. |
| phenyl vinyl ether | available from Aldrich Chemical Co. |
| succinic anhydride | available from Aldrich Chemical Co. |
| TEB-DAP | triethylboron-1,3-diaminopropane complex, from BASF SE, Ludwigshafen, Germany |
| TEB-DETA | triethylboron 2,2'-diaminodiethylamine complex, available from BASF SE |
| THFMA | tetrahydrofurfuryl methacrylate, obtained as SR 203 from Sartomer Co., West Chester, Pennsylvania |
| TnBB-MOPA | tri-n-butylborane methoxypropylamine complex, available from BASF SE, Ludwigshafen, Germany |
| triallyl isocyanurate | triallyl isocyanurate obtained as SR533 from Sartomer Co. |
| Aziridine | CX-100 crosslinked polyfunctional aziridine, trimethylolpropane tris(2-methyl-1-aziridinepropionate) from DSM Neoresins, Zwolle, The Netherlands. |
| TS-720 | TS-720 is a medium surface area fumed silica which has been surface treated with polydimethylsiloxane, PDMS from Cabot Corporation, Billerica, Massachusetts |

Example 1

A composition was prepared by dissolving 1.0 g of TEB-DAP and 2.0 g of di(ethylene glycol) divinyl ether, (DVE-2). To this was added 10 mL of tetrahydrofurfuryl methacrylate (THFMA) containing 0.5 g of dissolved succinic anhydride. The solution cured in 118 hours.

Example 2

A polymerizable composition was prepared by dissolving 1.0 g of TEB-DAP with 2.0 g of 1,4-butanediol divinyl ether. To this was added 10 mL of THFMA containing 0.5 g of dissolved succinic anhydride. The solution cured in 118 hours.

Example 3

A polymerizable composition was prepared by dissolving 1.0 g of TEB-DAP with 2.0 g of phenyl vinyl ether. To this was added 10 ml of THFMA containing 0.5 g of dissolved succinic anhydride. The solution cured in 118 hours.

Example 4

A polymerizable composition was prepared by dissolving 1.0 g of TEB-DAP with 2.0 g of 1,3-divinyltetramethyl disiloxane. To 5 mL of THFMA was dissolved 0.2 g of succinic anhydride followed by 0.5 mL of the TEB-DAB, 1,3-divinyltetramethyldisiloxane solution. The solution cured in 24 hours.

Example 5

A polymerizable composition was prepared by dissolving 1.0 g of TnBB-MOPA with 2.0 g 1,3-divinyltetramethyl disiloxane. To 5 mL of THFMA was dissolved 0.2 g of succinic anhydride followed by 0.5 mL of the TnBB-MOPA, 1,3-divinyltetramethyldisiloxane solution. The solution cured in 24 hours.

Curing performance for Examples 1 to 5 was monitored after 1, 4, 24 and 118 hours wherein curing was judged on a 1-10 scale with 1 meaning no cure (liquid), 5 meaning gel to partial cure, and 10 meaning complete cure. This was tested with a wooden applicator. Results are reported in TABLE 2 (below),

TABLE 2

| EXAMPLE | REACTIVE DILUENT | 1 | 4 | 24 | 118 |
|---|---|---|---|---|---|
| | TEB-DAP | | | | |
| 1 | di(ethylene glycol) divinyl ether | 1 | 2 | 6 | 10 |
| 2 | 1,4-butanediol divinyl ether | 1 | 2 | 7 | 9 |
| 3 | phenyl vinyl ether | 1 | 2 | 7 | 9 |
| 4 | 1,3-divinyltetramethyl-disiloxane | 7 | 9 | 10 | 10 |
| | TnBB-MOPA | | | | |
| 5 | 1,3-divinyltetramethyl-disiloxane | 7 | 9 | 10 | 10 |

Examples 6-17 and Comparative Examples A-E

To a 2-dram (7.3-mL) vial was added 2 g of reactive diluent and 1 g of the trialkylborane complex for all of the diluents except phenyl vinyl ether (Example 9), which was at 1 g of reactive diluent to 1 g of trialkylborane, Part A. This was agitated. To a second 2-dram (7.3-mL) vial was added 5.0 mL of 3M DP8005, Part B. Part A (0.5 mL) was added to Part B. This was mixed with a wooden applicator. The degree of curing was monitored after 1, 4, and 24 hours. Ratings were applied to the degree of cure as in Table 2. Results are reported in Table 3 (below).

TABLE 3

| EXAMPLE | TRIALKYL-BORANE COMPLEX | REACTIVE DILUENT | 1 | 4 | 24 |
|---|---|---|---|---|---|
| 6 | TEB-DAP | di(ethylene glycol) divinyl ether | 8 | 9 | 10 |
| 7 | TEB-DAP | 1,4-butanediol divinyl ether | 8 | 10 | 10 |
| 8 | TEB-DAP | tri(ethylene glycol)divinyl ether | 8 | 9 | 10 |
| 9 | TEB-DAP | phenyl vinyl ether | 7 | 9 | 10 |
| 10 | TEB-DAP | 1,3-divinyl-tetramethyl-disiloxane | 8 | 10 | 10 |
| COMPARATIVE EXAMPLE A | TEB-DAP | triallyl isocyanurate | 8 | 9 | 10 |
| COMPARATIVE EXAMPLE B | TEB-DAP | N-allylimizadole | 0 | 0 | 0 |
| COMPARATIVE EXAMPLE C | TEB-DAP | allyl butyrate | 6 | 8 | 10 |
| COMPARATIVE EXAMPLE D | TEB-DAP | allyl pentaerythritol | 7 | 8 | 10 |
| COMPARATIVE EXAMPLE E | TEB-DAP | Aziridine | 5 | 7 | 10 |
| 11 | TnBB-MOPA | di(ethylene glycol) divinyl ether | 4 | 6 | 10 |
| 12 | TnBB-MOPA | 1,4-butanediol divinyl ether | 4 | 9 | 10 |
| 13 | TnBB-MOPA | tri(ethylene glycol) divinyl ether | 8 | 8 | 10 |
| 14 | TnBB-MOPA | 1,3-divinyl-tetramethyl-disiloxane | 8 | 10 | 10 |
| 15 | TEB-DETA | di(ethylene glycol) divinyl ether | 4 | 6 | 10 |
| 16 | TEB-DETA | 1,4-butanediol divinyl ether | 8 | 9 | 10 |
| 17 | TEB-DETA | tri(ethylene glycol) divinyl ether | 8 | 8 | 10 |

Aging Study

A typical shelf-life for an acrylate adhesive is 6 months. Many times the adhesive cartridges are stored in refrigerated environments. The Part A lifetime can be determined by the addition or broadening of peaks observed by $^1$H and/or $^{11}$B nuclear magnetic resonance (NMR) spectroscopy. The accelerated aging to predict shelf life of the mixture was evaluated by monitoring the NMR peaks.

The diluent/trialkylborane was placed in a NMR tube at a 2:1 ratio by weight and placed in a 120° F. (48.9° C.) oven. $^1$H and $^{11}$B NMR spectra were read at initial (0), 3, 7 and 14 days. Observations were made and noted on the addition of the peaks or the broadening of peaks observed by NMR indicating the instability or the reactivity of the trialkylborane with the diluent. Yes="Y", No="N". Results are reported in Table 4 (below).

TABLE 4

| EXAMPLE | TRIALKYL BORANE-COMPLEX | REACTIVE DILUENT | NMR STABILITY $^1$H | $^{11}$B | Comments |
|---|---|---|---|---|---|
| 6 | TEB-DAP | di(ethylene glycol) divinyl ether | Y | Y | clear |
| 7 | TEB-DAP | 1,4-butanediol divinyl ether | Y | Y | clear |
| 8 | TEB-DAP | tri(ethylene glycol) divinyl ether | Y | Y | clear |
| 9 | TEB-DAP | phenyl vinyl ether | Y | Y | clear |
| Comparative Example A | TEB-DAP | triallyl isocyanurate | Y | Y | clear-yellow |
| Comparative Example B | TEB-DAP | N-allylimidazole | N | Y | yellow |
| Comparative Example C | TEB-DAP | allyl butyrate | N | Y | clear |
| Comparative Example D | TEB-DAP | allyl pentaerythritol | Y | Y | clear |
| Comparative Example E | TEB-DAP | Aziridine | N | Y | clear |
| 10 | TEB-DAP | 1,3-divinyltetramethyl-disiloxane | Y | Y | clear |
| 13 | TnBB-MOPA | tri(ethylene glycol) divinyl ether | N | N | clear |
| 14 | TnBB-MOPA | 1,3-divinyltetramethyl-disiloxane | Y | Y | Clear |

In Table 5, the columns "Cured" and "Stable" present a summary of the degree of cure of the diluent/trialkylborane in the presence of a decomplexing agent (from Table 3) and the stability of the diluent in the presence of just the trialkylborane alone by $^1$H and $^{11}$B NMR (from Table 4). A "yes" indicates that the sample cured within 24 hours and was stable over time. A "no" indicates that one of the two did not occur.

TABLE 5

| EXAMPLE | TRIALKYL BORANE-COMPLEX | REACTIVE DILUENT | RESULTS SUMMARY Cured | Stable | Cured and Stable | Functional Group |
|---|---|---|---|---|---|---|
| 6 | TEB-DAP | di(ethylene glycol) divinyl ether | yes | yes | yes | vinyl ether |
| 7 | TEB-DAP | 1,4-butanediol divinyl ether | yes | yes | yes | vinyl ether |
| 8 | TEB-DAP | tri(ethylene glycol) divinyl ether | yes | yes | yes | vinyl ether |
| 9 | TEB-DAP | phenyl vinyl ether | yes | yes | yes | vinyl ether |
| Comparative Example A | TEB-DAP | triallyl isocyanurate | yes | yes | yes | allyl amides |
| Comparative Example B | TEB-DAP | N-allyl imidazole | no | no | no | allyl amines |
| Comparative Example C | TEB-DAP | allyl butyrate | yes | no | no | allyl ester |
| Comparative Example D | TEB-DAP | allyl pentaerythritol | yes | yes | yes | allyl ethers |
| Comparative Example E | TEB-DAP | Aziridine | yes | no | no | polyaziridine |
| 10 | TEB-DAP | 1,3-divinyl-tetramethyl-disiloxane | yes | yes | yes | vinyl siloxane |
| 13 | TnBB-MOPA | tri(ethylene glycol) divinyl ether | yes | no | no | vinyl ether |
| 14 | TnBB-MOPA | 1,3-divinyl-tetramethyl-disiloxane | yes | yes | yes | vinyl siloxane |

Examples 18-19 and Comparative Example F

Examples 18-19 and Comparative Example F (Part A compositions) were prepared by combining the components reported in Table 6 (below).

TABLE 6

| EXAMPLE | PART A COMPONENTS | PART B COMPONENTS |
|---|---|---|
| 18 | 1.9 g of TEB-DAP<br>3.2 g of allylpentaerythritol (APE)<br>22.7 g of di(ethylene glycol) divinyl ether<br>1.5 g of TS-720<br>13.6:1 ratio of diluents to TEB-DAP | PART B from 3M SCOTCH-WELD structural plastic adhesive DP8005, translucent, 35 mL Duo-Pak, 62-2786-0437-6 |
| 19 | 2.6 g of TEB-DAP<br>22.5 g of di(ethylene glycol) divinyl ether<br>2 g of TS-720<br>8.6:1 diluents to TEB-DAP | DP8005 Part B |
| COMPARATIVE EXAMPLE F | DP8005 Part A | DP8005 Part B |

The components in Table 6 were mixed by hand followed by mixing on a SpeedMixer DAC mixer (available from FlackTek Inc., Landrum, S.C.) at 2500 rpm for several minutes, unless otherwise noted.

The polymerizable composition (part B) and the initiator component (part A) was packaged in a Sulzer Mixpac 10:1 cartridge system. The larger cylinder of the cartridge held the polymerizable composition and the smaller cylinder held the initiator component. Air bubbles were removed by a centrifuge. The two parts were combined by simultaneous extrusion through a 3M SCOTCH-WELD EPX MIX NOZZLE 9164 using a 3M EPX PLUS II applicator, both from 3M Company.

Overlap Shear Strength Test

Overlap shear strength was determined according to ASTM D1002-10 (2010) "Standard Test Method for Apparent Shear Strength of Single-Lap-Joint Adhesively Bonded Metal Specimens by Tension Loading (Metal-to-Metal)" with modification as described below. Test panels had nominal dimensions of 1 inch (2.5 cm)×4 inches length (10.2 cm)×0.125 inch (0.3 cm) thick.

The bonding composition was applied directly onto one untreated panel and a second untreated test panel was immediately placed against the bonding composition so that the overlapped area was 0.5 inch×1 inch (1.3 cm×2.5 cm). The bond was fixtured with binder clips and allowed to cure at room temperature (22° C.) for at least 48 hours, unless otherwise stated, at which time the clips were removed. The small amount of bonding composition that squeezed out of the bondline was allowed to remain.

Two repetitions were done on different type of panels and with each bonding composition: polypropylene (PP), high-density polyethylene (HDPE), both available from Plastic International, Eden Prairie, Minn. Each panel was cleaned with isopropyl alcohol and allowed to dry.

In addition Overlap Shear testing was done on AlCAD, Aluminum clad SHT 2024 T3, 1 inch (2.5 cm)×4 inches length (10.2 cm)×0.063 inch (0.15 cm) thick, and Stainless Tags, Stainless SHT CR 304 2B Pl, 20GA x1 inch (2.5 cm)×4 inches (10.2 cm), both available from Ryerson Metals, Minneapolis, Minn. The surfaces of these panels were abraded with a 3M SCOTCH-BRITE SCOUR PAD from 3M Company followed by cleaning with isopropyl alcohol. The substrate was allowed to dry.

After 2 days of curing, the bonds were tested to failure or to substrate yield using a tensile testing machine. The cross-head speed was 0.5 inches/minute (1.27 cm/minute) for stainless steel and aluminum. The cross-head speed was 2.0 inches/min for HDPE and PP. The tests were carried out at room temperature. Maximum over-lap shear values were recorded in megapascals (MPa). Failure modes of the substrate were noted as follows: S=substrate yield; C=cohesive failure; M=both substrate and cohesive failure; A=adhesive failure.

Work-Life Test

The Overlap Shear Strength Test method above was followed, except that the second untreated test panel was not immediately placed against the bonding composition but rather the first panel bearing the bonding composition was allowed to stand in air for the time specified in the individual Examples. At the end of the elapsed time 0, 1, 3, 5, 7, 10, 15, 30 minutes, (i.e., open time), the second untreated panel was placed against the bonding composition to provide the overlapped area, clips were attached, and the bond cured for at least 48 hours at room temperature unless otherwise stated. The test panels were HDPE and PP.

Rate of Strength Build Test

The method outlined in the Overlap Shear Strength Test Method above was followed except that the bonds were cured for less than 48 hours. The bonds were cured for the times specified in the Examples. At the end of the elapsed time (i.e., cure time), the clips were removed and the bonds were tested as above. The test panels were HDPE.

Test specimens were prepared and tested according to the Overlap Shear Strength Test (reported in Table 7), Work-life Test (reported in Table 8), and Rate of Strength Build Test (reported in Table 9), all below.

TABLE 7

| | OVERLAP SHEAR BOND STRENGTH, MPa (failure mode) | | | |
|---|---|---|---|---|
| EXAMPLE | PP | HDPE | Al | Steel |
| 18 | 5.26 (S) | 5.01 (C) | 3.23 (A) | not determined |
| 19 | 5.63 (S) | 4.79 (A) | 7.77 (A) | 10.31 (M) |
| COMPARATIVE EXAMPLE F | 7.82 (S) | 6.89 (C) | 10.47 (A) | 7.18 (M) |

TABLE 8

| EXAMPLE | TIME, minutes | OVERLAP SHEAR BOND STRENGTH, MPa (failure mode) | |
| --- | --- | --- | --- |
| | | HDPE | PP |
| 18 | 0 | 4.59 (C) | 4.96 (S) |
| | 1 | 5.25 (C) | 4.22 (S) |
| | 3 | 5.50 (C) | 4.84 (S) |
| | 5 | 5.47 (C) | 4.52 (S) |
| | 7 | 5.38 (C) | 3.96 (S) |
| | 10 | 3.13 (A) | 2.30 (A) |
| | 15 | 2.16 (C) | 1.03 (A) |
| | 30 | 0.61 (C) | 1.32 (A) |
| 19 | 0 | 6.86 (C) | 7.76 (S) |
| | 1 | 6.94 (C) | 6.40 (S) |
| | 3 | 6.01 (A) | 6.56 (S) |
| | 5 | 6.35 (C) | 5.11 (S) |
| | 7 | 5.72 (C) | 4.83 (S) |
| | 10 | 4.96 (A) | 4.55 (S) |
| | 15 | 3.08 (A) | 4.95 (S) |
| | 30 | 0.17 (C) | 0.77 (S) |

TABLE 9

| EXAMPLE | TIME, hours | OVERLAP SHEAR BOND STRENGTH, MPa (failure mode) HDPE |
| --- | --- | --- |
| 19 | 0.5 | 0.23 (C) |
| | 1 | 0.81 (C) |
| | 2 | 3.83 (A) |
| | 3 | 5.23 (C) |
| | 6 | 5.36 (C) |
| | 24 | 4.64 (C) |

All cited references, patents, and patent applications in the above application for letters patent are herein incorporated by reference in their entirety in a consistent manner. In the event of inconsistencies or contradictions between portions of the incorporated references and this application, the information in the preceding description shall control. The preceding description, given in order to enable one of ordinary skill in the art to practice the claimed disclosure, is not to be construed as limiting the scope of the disclosure, which is defined by the claims and all equivalents thereto.

What is claimed is:

1. A two-part adhesive composition comprising:

(I) a Part A composition comprising:

(a) a complex of an organoborane and an amine complexing agent, wherein the amine complexing agent is represented by the formula

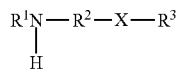

wherein:

$R^1$ represents H or an alkyl group having from 1 to 4 carbon atoms;

$R^2$ represents an alkylene group having from 2 to 12 carbon atoms;

$R^3$ represents H, an alkyl group having from 1 to 4 carbon atoms, or an aminoalkyl group having from 2 to 6 carbon atoms; and X represents O or

wherein $R^4$ represents H or an alkyl group having from 1 to 4 carbon atoms; and (b) reactive diluent selected from the group consisting of components:

(i) at least one vinyl ether represented by the formula

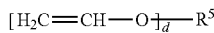

wherein:

$R^5$ represents a d-valent organic group having from 1 to 18 carbon atoms, wherein the organic group is composed of carbon, hydrogen, and optionally oxygen; and d represents 1, 2, 3, or 4; or (ii) at least one vinylpolysiloxane represented by the formula

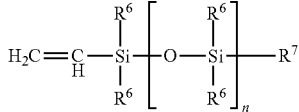

wherein:

each $R^6$ independently represents an alkyl group having from 1 to 6 carbon atoms, or a phenyl group;

$R^7$ represents an alkyl group having from 1 to 18 carbon atoms or a vinyl group; and n is a positive integer in the range of from 1 to 10, ; and (iii) combinations of components (i) and (ii), wherein the component (b) comprises component (ii), and wherein if $R^3$ represents an alkyl group having from 1 to 4 carbon atoms and X represents O, then the reactive diluent is essentially free of component (i); and (II) a Part B composition comprising:

a decomplexing agent that decomplexes the organoborane and the amine complexing agent; and at least one silicon-free free-radically polymerizable ethylenically-unsaturated compound selected from the group consisting of (meth)acrylates, (meth)acrylamides, and combinations thereof, wherein the two-part adhesive composition is essentially free of organic polythiol compounds.

2. The two-part adhesive composition of claim 1, wherein the Part A composition is essentially free of free-radically polymerizable ethylenically-unsaturated compounds other than the reactive diluent.

3. The two-part adhesive composition of claim 1, wherein $R^1$ is H.

4. The two-part adhesive composition of claim 1, wherein X represents

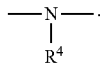

5. The two-part adhesive composition of claim 1, wherein the component (b) comprises the component (i).

6. The two-part adhesive composition of claim 1, wherein the component (b) comprises the components (i) and (ii).

7. A method of making an adhesive composition, the method comprising combining a Part A composition and a Part B composition to provide the adhesive composition, wherein the Part A composition comprises:

(a) a complex of an organoborane and an amine complexing agent, wherein the amine complexing agent is represented by the formula

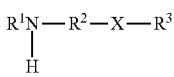

wherein:
R$^1$ represents H or an alkyl group having from 1 to 4 carbon atoms;
R$^2$ represents an alkylene group having from 2 to 12 carbon atoms;
R$^3$ represents H, an alkyl group having from 1 to 4 carbon atoms, or an aminoalkyl group having from 2 to 6 carbon atoms; and
X represents O or

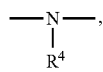

wherein R$^4$ represents H or an alkyl group having from 1 to 4 carbon atoms; and (b) reactive diluent selected from the group consisting of components:
(i) at least one vinyl ether represented by the formula

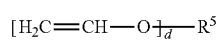

wherein:
R$^5$ represents a d-valent organic group having from 1 to 18 carbon atoms, wherein the organic group is composed of carbon, hydrogen, and optionally oxygen; and
d represents 1, 2, 3, or 4; or (ii) at least one vinylpolysiloxane represented by the formula

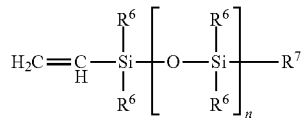

wherein:
each R$^6$ independently represents an alkyl group having from 1 to 6 carbon atoms, or a phenyl group;
R$^7$ represents an alkyl group having from 1 to 18 carbon atoms or a vinyl group; and
n is a positive integer in the range of from 1 to 10; and
(iii) combinations of components (i) and (ii),
wherein if R$^3$ represents an alkyl group having from 1 to 4 carbon atoms and X represents O, then the reactive diluent is essentially free of the component (i), and wherein the component (b) comprises the component (ii),
wherein the Part B composition comprises:
a decomplexing agent that decomplexes the organoborane and the amine complexing agent; and
at least one ethylenically-unsaturated compound selected from the group consisting of (meth)acrylates, (meth)acrylamides, and combinations thereof, and
wherein the adhesive composition is essentially free of organic polythiol compounds.

8. The method of claim 7, wherein the Part A composition is essentially free of free-radically polymerizable ethylenically-unsaturated compounds other than the reactive diluent.

9. The method of claim 7, wherein R$^1$ is H.

10. The method of claim 7, wherein X represents

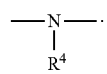

11. The method of claim 7, wherein the component (b) comprises the component (i).

12. The method of claim 7, wherein the component (b) comprises the components (i) and (ii).

* * * * *